United States Patent
Chang et al.

(10) Patent No.: US 9,412,331 B2
(45) Date of Patent: Aug. 9, 2016

(54) DISPLAY SYSTEM, IMAGE COMPENSATION METHOD AND NON-TRANSITORY COMPUTER READABLE STORAGE MEDIUM THEREOF

(71) Applicant: INSTITUTE FOR INFORMATION INDUSTRY, Taipei (TW)

(72) Inventors: Teng-Chang Chang, Taipei (TW); Ming-Fang Weng, Kinmen County (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 29 days.

(21) Appl. No.: 14/504,439

(22) Filed: Oct. 2, 2014

(65) Prior Publication Data

US 2016/0042714 A1 Feb. 11, 2016

(30) Foreign Application Priority Data

Aug. 6, 2014 (TW) .............................. 103126932 A

(51) Int. Cl.
*G09G 5/00* (2006.01)
*G06F 3/03* (2006.01)
*G09G 5/02* (2006.01)

(52) U.S. Cl.
CPC *G09G 5/005* (2013.01); *G06F 3/03* (2013.01); *G09G 5/026* (2013.01); *G09G 2340/0464* (2013.01); *G09G 2380/02* (2013.01)

(58) Field of Classification Search
CPC .................................. G06F 3/017; G09G 5/00
See application file for complete search history.

(56) References Cited

U.S. PATENT DOCUMENTS

| | | | |
|---|---|---|---|
| 2010/0164888 A1* | 7/2010 | Okumura | G06F 1/1626 345/173 |
| 2012/0092363 A1* | 4/2012 | Kim | G06T 5/006 345/618 |
| 2015/0153778 A1* | 6/2015 | Jung | G06F 1/1652 345/156 |

* cited by examiner

*Primary Examiner* — Olga Merkoulova
(74) *Attorney, Agent, or Firm* — CKC & Partners Co., Ltd.

(57) ABSTRACT

A display system, an image compensation method and a non-transitory computer readable storage medium thereof are provided. The display system includes a flexible panel, a prediction unit, a compensation unit, an image synthesis unit and a control unit. The prediction unit predicts a prediction angle of the flexible panel in a final time. The compensation unit generates a first compensation image according to an initial display angle of the flexible panel in an initial time, and generates a second compensation image according to the prediction angle. The image synthesis unit synthesizes a first display image according to the first compensation image and the second compensation image. The control unit selectively substitutes the first display image for an image displayed on the flexible panel in the final time.

12 Claims, 5 Drawing Sheets

DISPLAY SYSTEM, IMAGE COMPENSATION METHOD AND NON-TRANSITORY COMPUTER READABLE STORAGE MEDIUM THEREOF

RELATED APPLICATIONS

This application claims priority to Taiwan Application Serial Number 103126932, filed Aug. 6, 2014 the entirety of which is herein incorporated by reference.

BACKGROUND

1. Technical Field

The present disclosure relates to a display system. More particularly, the present disclosure relates to a display system having a flexible panel.

2. Description of Related Art

Since a flexible panel is meant to be bent or folded, its display product is not necessarily planar, which allows a diverse shape and design of the product. Moreover, in that the flexible panel features slim and crashworthy properties, it is adapted for portable devices like mobile phone, tablet computer, laptop computer, etc. Generally, when the flexible panel is subjected to bending or folding, the bent angle of the bent panel may result in distortion on image displayed on the flexible panel. Accordingly, not only the quality of displaying image but also the touch accuracy is affected.

To address the issues, the conventional approach is to sense a final bent angle of the flexible panel by a sensor, and execute an image processing method on a final image displayed on the flexible panel according to the final bent angle. Therefore, the final image displayed on the flexible panel can be compensated. However, the conventional approach has to wait first for the determination of the final angle, and conducts a sequence of algorithms on the final image. In this regard, the user is unable to see a real-time compensated image displayed on the flexible panel when using the flexible display. In other words, a delay may occur in displaying image on the flexible display.

SUMMARY

One aspect of the present disclosure is to provide a display system. The display system includes a flexible panel, a prediction unit, a compensation unit, an image synthesis unit, and a control unit. The prediction unit is configured to predict a prediction angle of the flexible panel in a final time when the flexible panel is bent or folded. The compensation unit is configured to generate a first compensation image according to an initial display angle of the flexible panel in an initial time, and configured to generate a second compensation image according to the prediction angle. The image synthesis unit is configured to synthesize a first display image according to the first compensation image and the second compensation image. The control unit is configured to selectively substitute the first display image for an image displayed on the flexible panel in the final time.

Another aspect of the present disclosure is to provide an image compensation method. The image compensation method includes: generating a first compensation image according to an initial display angle of the flexible panel in an initial time; predicting a prediction angle of the flexible panel in a final time when the flexible panel is bent or folded; generating a second compensation image according to the prediction angle; synthesizing a first display image according to the first compensation image and the second compensation image; and selectively substituting the first display image for an image displayed on the flexible panel in the final time.

Other one aspect of the present disclosure is to provide a non-transitory computer readable storage medium that is configured to execute an image compensation method. The image compensation method includes: generating a first compensation image according to an initial display angle of the flexible panel in an initial time; predicting a prediction angle of the flexible panel in a final time when the flexible panel is bent or folded; generating a second compensation image according to the prediction angle; synthesizing a first display image according to the first compensation image and the second compensation image; and selectively substituting the first display image for an image displayed on the flexible panel in the final time.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
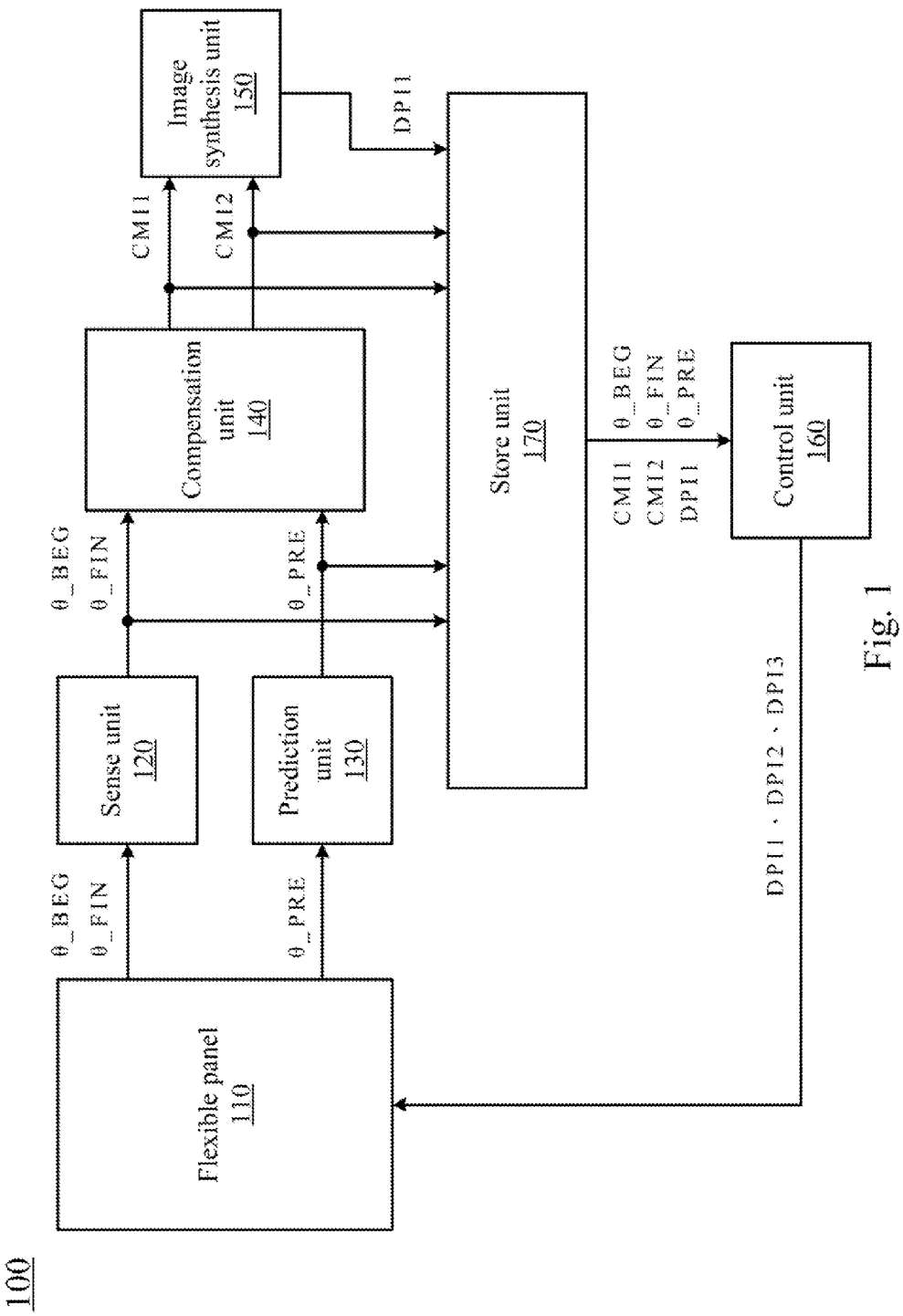
FIG. 1 depicts a schematic diagram of a display system according to one embodiment of present disclosure

Reference will now be made in detail to the present embodiments of the disclosure, examples of which are illustrated in the accompanying drawings. Wherever possible, the same reference numbers are used in the drawings and the description to refer to the same or like parts.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

FIG. 1 depicts a schematic diagram of a display system 100 according to one embodiment of the present disclosure. As shown in FIG. 1, the display system 100 includes a flexible panel 110, a sense unit 120, a prediction unit 130, a compensation unit 140, an image synthesis unit 150, and a control unit 160. The flexible panel 110 may be a flexible display, which allows to be bent into arcuate or crave shape, or the flexible panel 110 may be a folded-type display unit which comprises at least two panels electrically coupled to each other in one side. The sense unit 120 is electrically coupled to flexible panel 110, and is configured to sense a bent angle of the flexible panel 110. The prediction unit 130 is electrically coupled to the flexible panel 110. The prediction unit 130 is configured to predict a prediction angle θ_PRE of the flexible panel 110 in a final time when the flexible panel is bent or folded. The compensation unit 140 is electrically coupled to the sense unit 120 and the prediction unit 130. In an initial time, the sense unit 120 senses an initial display angle θ_BEG of the flexible panel 110, and outputs the initial display angle θ_BEG to the compensation unit 140. The compensation unit 140 is configured to generate a first compensation image CMI1 according to the initial display angle θ_BEG of the flexible panel 110 in an initial time, and generate a second compensation image CMI2 according to the prediction angle θ_PRE.

The image synthesis unit 150 is electrically coupled to the compensation unit 140. The image synthesis unit 150 is configured to synthesize a first display image DPI1 according to the first compensation image CMI1 and the second compensation image CMI2. The control unit 160 is configured to selectively substitute the first display image DPI1 for an image displayed on the flexible panel 110 in the final time.

In one embodiment, the display system 100 further includes a store unit 170 configured to store the initial display angle θ_BEG, the prediction angle θ_PRE, the first compensation image CMI1, the second compensation image CMI2, the first display image DPI1, and a final display angle θ_FIN of the flexible panel 110 in the final time. Further, the control unit 160 determines whether the final display angle θ_FIN is substantially equivalent to the prediction angle θ_PRE. A determination is made by the control unit 160 as to whether to access the first display image DPI1 from the store unit 170 according to a determination result, and whether to substitute the first display image DPI1 for the image displayed on the flexible panel 110 in the final time.

Figure 2:
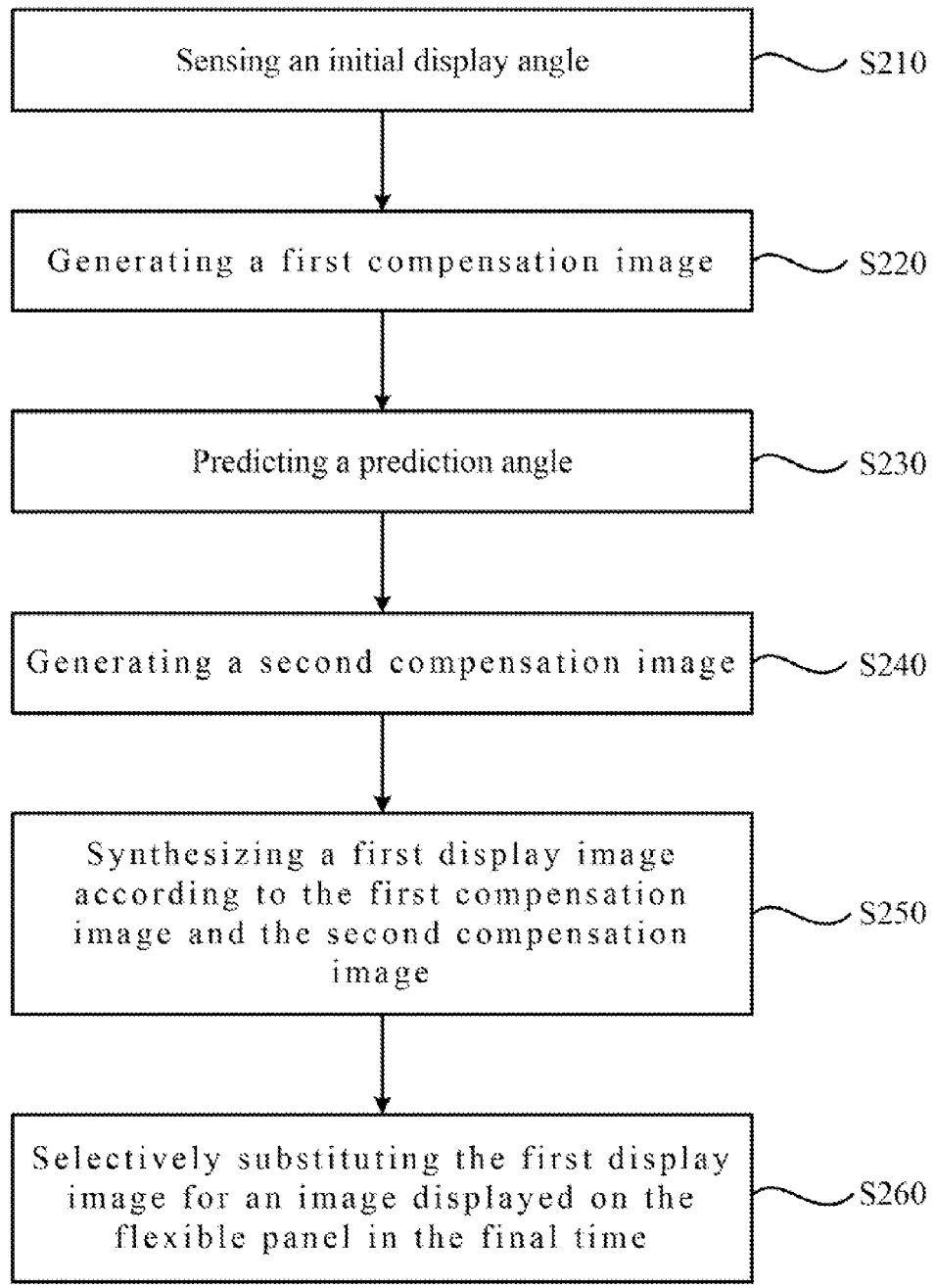
FIG. 2 depicts a flow chart of an image compensation method according to one embodiment of the present disclosure.

Reference is made to FIG. 1 and FIG. 2. FIG. 2 depicts a flow chart of an image compensation method 200 according to one embodiment of the present disclosure. The image compensation method 200 may take the form of a computer program product (e.g., application program) and may be stored at a non-transitory computer readable storage medium so that computer can read the non-transitory computer readable storage medium and execute image compensation method 200. The aforementioned computer includes a central process unit, a control unit, a microprocessor, or the equivalents which can execute instructions. The non-transitory computer readable storage medium includes a read-only memory, flash memory, floppy drive, hard drive, optical disk, thumb disk, magnetic tape, cloud database or equivalents.

The image compensation method 200 is adapted for the flexible panel 100 of FIG. 1. In order to describe the image compensation method 200 clearly, the image compensation method 200 is illustrated with the display system 100 of FIG. 1, but the present disclosure is not limited in this regard.

First, in operation S210, the initial display angle θ_BEG of the flexible panel 110 in the initial time is sensed by the sense unit 120. Next, in operation S220, the first compensation image CMI1 is generated by the compensation unit 140 according to the initial display angle θ_BEG. Next, in operation S230, the prediction angle θ_PRE of the flexible panel 110 in the final time is predicted by the prediction unit 130 when the flexible panel 110 is bent or folded. Next, in operation S240, the second compensation image CMI2 is generated by the compensation unit 140 according to the prediction angle θ_PRE. Next, in operation S250, the first display image DPI1 is synthesized according to the first compensation image CMI1 and the second compensation image CMI2. Next, in operation S260, the first display image DPI1 is selectively substituted by the control unit 160 for the image displayed on the flexible panel 10 in the final time.

Figure 3:
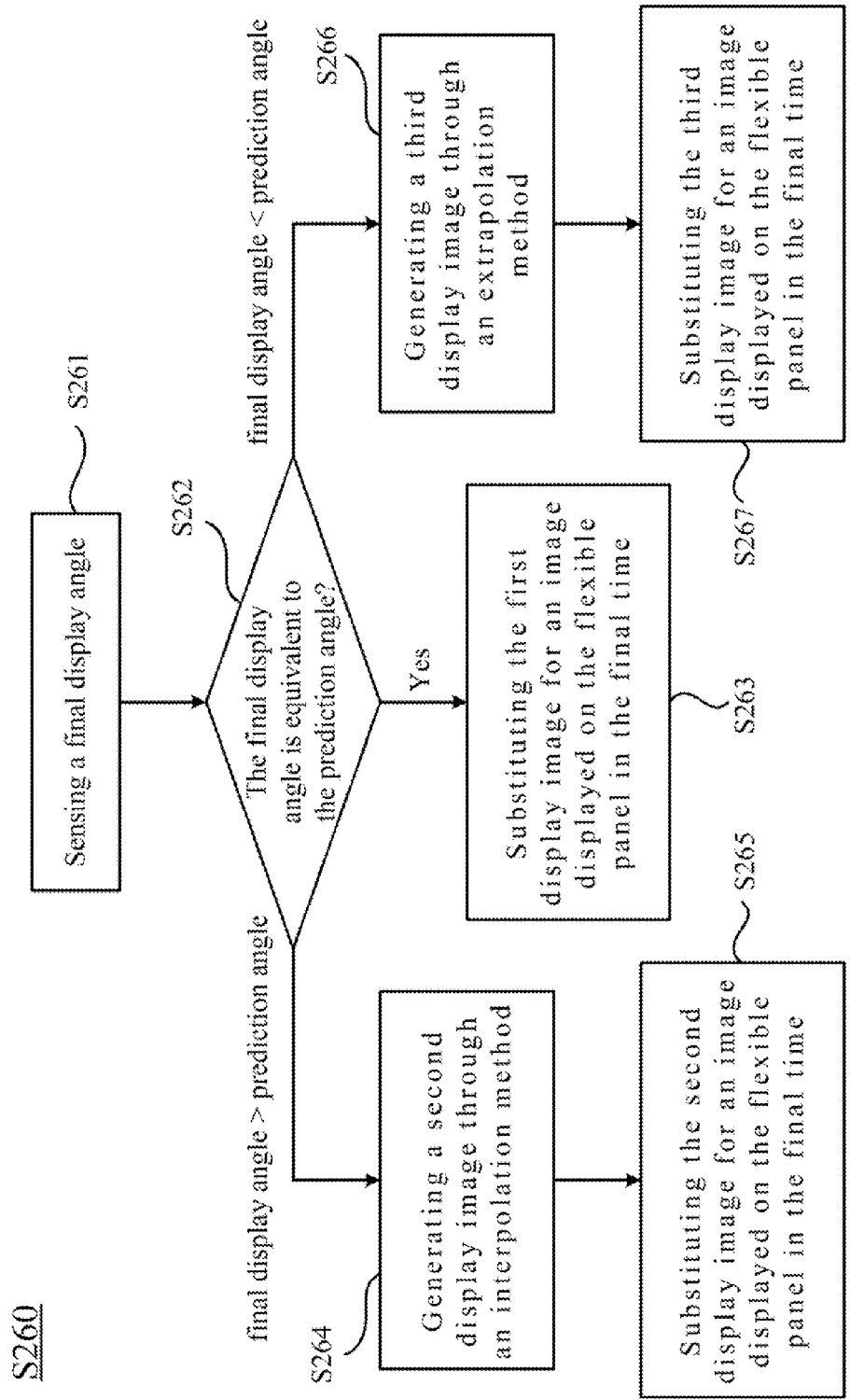
FIG. 3 depicts a flow chart of a step according to the image compensation method of FIG. 2 of the present disclosure.

In one embodiment, operation S260 further includes operations S261-S267. Reference is made to FIG. 3. FIG. 3 depicts a flow chart of a step according to the image compensation method 200 of FIG. 2 of the present disclosure. As shown in FIG. 3, in operation S261, the final display angle θ_FIN of the flexible panel 110 in the final time is sensed by the sense unit 120. Next, in operation S262, a determination is made by the control unit 160 as to whether the final display angle θ_FIN is substantially equivalent to the prediction angle θ_PRE. When the final display angle θ_FIN is substantially equivalent to the prediction angle θ_PRE, operation S263 is executed. In operation S263, the first display image DPI1 is substituted by the control unit 160 for the image displayed on the flexible panel 110 in the final time.

Figure 4A:
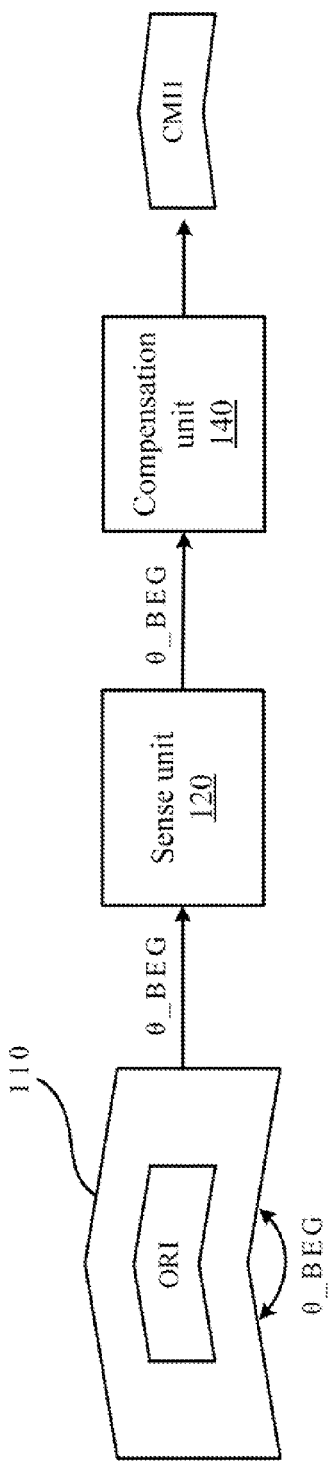
FIG. 4A-FIG. 4D depict schematic diagrams of an image compensation method according to one embodiment of the present disclosure.

Reference is made to FIG. 4A-FIG. 4D. FIG. 4A-FIG. 4D depict schematic diagrams of an image compensation method according to one embodiment of the present disclosure. As shown in FIG. 4A, in the initial time, an initial image ORI is displayed on the flexible panel 110, and the sense unit 120 senses the initial display angle θ_BEG (e.g., 170 degrees) of the flexible panel 110 in the initial time. The compensation unit 140 generates the first compensation image CMI1 according to the initial display angle θ_BEG.

Figure 4B:
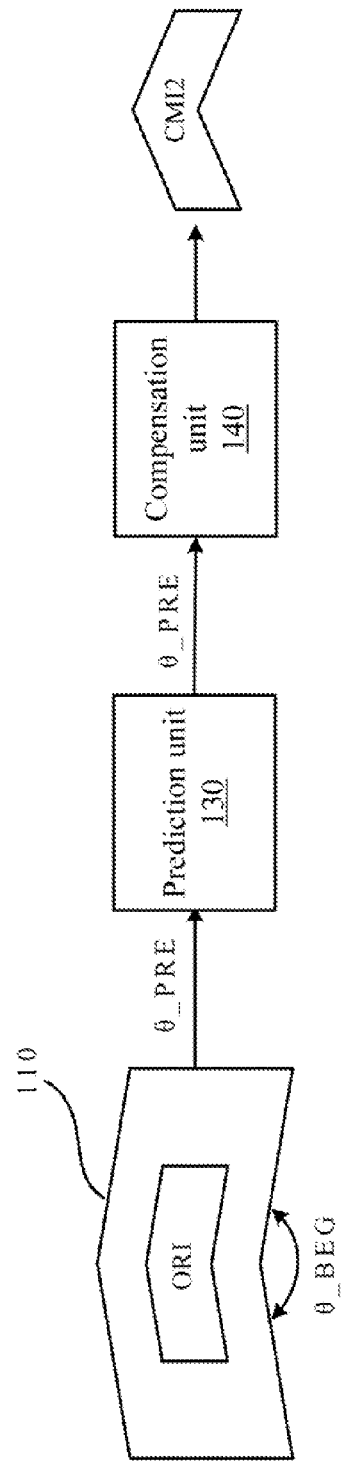

Next, as shown in FIG. 4B, the prediction unit 130 predicts the prediction angle θ_PRE (e.g., 150 degrees) of the flexible panel 110 in the final time. The compensation unit 140 generates the second compensation image CMI2 according to the prediction angle θ_PRE.

Figure 4C:
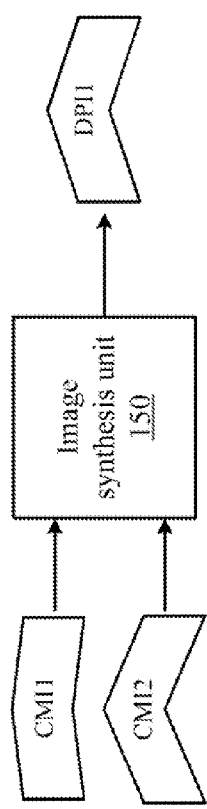

Next, in FIG. 4C, the image synthesis unit 150 synthesizes the first display image DPI1 according to the first compensation image CMI1 and the second compensation image CMI2.

Figure 4D:
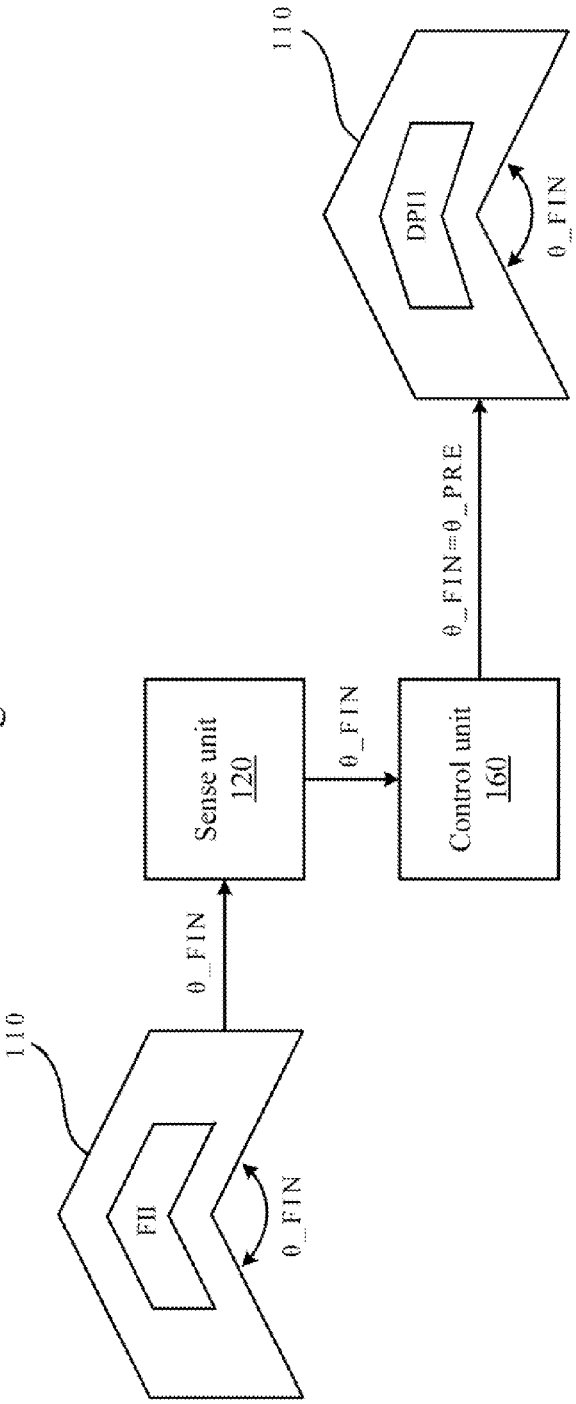

Next, as shown in FIG. 4D, in the final time, a final image FII is displayed on the flexible panel 110. In this time, the final image FII is a distorted image. If the final display angle θ_FIN of the bent flexible panel 110 in the final time is 150 degrees (i.e., equivalent to the prediction angle θ_PRE), the control unit 160 substitutes the first display image DPI1 for the final image FII, and displays the first display image DPI1 on the flexible panel 110. It is noted that a range of equivalent of angles is within 5 percent. In other words, the control unit 160 determines that the final display angle ELFIN is substantially equivalent to the prediction angle θ_PRE on condition that a angle difference between the final display angle θ_FIN and the prediction angle θ_PRE is within positive/negative 9 degrees.

Reference is made to FIG. 3. In operation S262, when the final display angle θ_FIN (e.g., 160 degrees) is larger than the prediction angle θ_PRE, operation S264 is executed. In operation S264, the second display image DPI2 is generated by the control unit 160 through an interpolation method according to the first compensation image CMI1 the second compensation image CMI2, the initial display angle θ_BEG, the prediction angle θ_PRE, and the final display angle θ_FIN. Next, operation S265 is executed. In operation S265, the second display image DPI2 is substituted by the control unit 160 for the image displayed on the flexible panel 110 in the final time.

In one embodiment, when the final display angle θ_FIN is larger than the prediction angle θ_PRE, the control unit 160 accesses the first compensation image CMI1 the second compensation image CMI2, the initial display angle θ_BEG, the prediction angle θ_PRE, and the final display angle θ_FIN from the store unit 170, and the second display image DPI2 is obtained by the control unit 160 through a formula (1) (i.e., the interpolation method) as shown below:

$$If = I2 + \frac{(I1 - I2) \times (\theta f - \theta 2)}{(\theta 1 - \theta 2)} \quad (1)$$

In which If represents the second display image, I1 represents the first compensation image, I2 represents the second compensation image, θf represents the final display angle, θ1 represents the initial display angle, θ2 represents the prediction angle.

Since the control unit 160 can obtain the second display image DPI2 by directly applying the calculated first compensation image CMI1 and the calculated second compensation image CMI2 in the interpolation method, the algorithm is uncomplicated. Therefore, when the final display angle θ_FIN of the flexible panel 110 in the final time is larger than the prediction angle θ_PRE, the control unit 160 can rapidly substitute the second display image DPI2 for the image displayed on the flexible panel 110 in the final time. Accordingly, on condition of allowable image distortion, time for displaying image by the display system 100 can be reduced, and fluency of watching image can be enhanced.

Reference is made to FIG. 3. In operation S262, when the final display angle θ_FIN (e.g., 140 degrees) is smaller than the prediction angle θ_PRE, operation S266 is executed. In operation S266, the third display image DPI3 is generated by the control unit 160 through an extrapolation method according to the first compensation image CMI1, the second compensation image CMI2, the initial display angle θ_BEG the prediction angle θ_PRE, and the final display angle θ_FIN. Next, operation S267 is executed. In operation S267, the third display image DPI3 is substituted by the control unit 160 for the image displayed on the flexible panel 110 in the final time.

In one embodiment, when the final display angle θ_FIN is smaller than the prediction angle θ_PRE, the control unit 160 accesses the first compensation image CMI1, the second compensation image CMI2, the initial display angle θ_BEG, the prediction angle θ_PRE, and the final display angle θ_FIN from the store unit 170, and the third display image DPI3 is obtained by the control unit 160 through a formula (2) (i.e., the extrapolation method) as shown below:

$$If = I1 - \frac{(I1 - I2) \times (\theta 1 - \theta f)}{(\theta 1 - \theta 2)} \quad (2)$$

In which If represents the third display image, I1 represents the first compensation image, I2 represents the second compensation image, θf represents the final display angle, θ1 represents the initial display angle, θ2 represents the prediction angle.

Similarly, since the control unit 160 can obtain the third display image DPI3 by directly applying the calculated first compensation image CMI1 and the calculated second compensation image CMI2 in the extrapolation method, the algorithm is uncomplicated. Therefore, when the final display angle θ_FIN of the flexible panel 110 in the final time is smaller than the prediction angle θ_PRE, the control unit 160 can rapidly substitute the third display image DPI3 for the image displayed on the flexible panel 110 in the final time. Accordingly, on condition of allowable image distortion, time for displaying image by the display system 100 can be reduced, and fluency of watching image can be enhanced.

In one embodiment, operation S230 includes: the prediction angle θ_PRE is predicted by the prediction unit 130 according to a velocity and an acceleration of the flexible panel 110 when the flexible panel is bent or folded. In one embodiment, the prediction unit 130 can collect interaction data between a user and the flexible panel 110, and stores the interaction data in a database. The interaction data include velocities and accelerations of the flexible panel 110 bent or folded by the user and usual display angles of the flexible panel 110. Further, the prediction unit 130 includes a prediction model built through a regression analysis. Specifically, the prediction model predicts a display angle of the flexible panel 110 according to a velocity and an acceleration of the flexible panel 110 when the flexible panel 110 is bent or folded by the user. Next, a final display angle is feedbacked to the predict model, and the predict model compares the predicted display angle with the final display angle so as to correct accuracy of prediction.

In one embodiment, the compensation unit 140 can generate the first compensation image CMI1 and the second compensation image CMI2 through Seam-Carving algorithm. Specifically, Seam-Carving algorithm is to calculate each pixel gradient of an image so as to keep main feature of the image, and is to scale minor feature of the image with a ratio. Next, a new image is synthesized according to the image with main feature and the image with scaled minor feature.

In another embodiment, the compensation unit 140 can generate the first compensation image CMI1 and the second compensation image CMI2 through Scale-and-Stretch algorithm. Specifically, Scale-and-Stretch algorithm is to scale main feature of the image and minor feature of the image with different ratios. Next, a new image is synthesized according to the image with scaled main feature and the image with scaled minor feature.

The aforementioned embodiments of the compensation unit 140 are exemplary, and the present disclosure is not limited in this regard. In other words, it will be apparent to those skilled in the art that various modifications and variations can be made to the structure of the present disclosure without departing from the scope or spirit of the disclosure.

In one embodiment, the image synthesis unit 150 can synthesize the first display image according to the first compensation image CMI1 and the second compensation image CMI2 through Feathering algorithm. Specifically, Feathering algorithm is to overlap the first compensation image CMI1 on the second compensation image CMI2, in which a juncture of two images is formed by weight distribution such that a boundary of the first compensation image CMI1 can match a boundary of the second compensation image CMI2. Weight distribution can be determined with a ratio from a difference between the initial display angle θ_BEG and the final display angle θ_FIN to a difference between the prediction angle θ_PRE and the final display angle θ_FIN.

The aforementioned embodiment of the image synthesis unit 150 is exemplary, and the present disclosure is not limited in this regard. In other words, it will be apparent to those skilled in the art that various modifications and variations can be made to the structure of the present disclosure without departing from the scope or spirit of the disclosure.

As mentioned above, the display system 100 or the image compensation method 200 may be implemented in terms of software, hardware and/or firmware. For instance, if the execution speed and accuracy have priority, then the display system 100 may be implemented in terms of hardware and/or firmware. If the design flexibility has higher priority, then the display system 100 may be implemented in terms of software. Furthermore, the display system 100 may be implemented in terms of software, hardware and firmware in the same time. It is noted that the foregoing examples or alternates should be treated equally, and the present disclosure is not limited to these examples or alternates. Anyone who is skilled in the prior art can make modification to these examples or alternates in flexible way if necessary.

As mentioned above, a compensation image (e.g., the first display image DPI1) can be immediately displayed on the flexible panel 110 by predicting a prediction angle $\theta\_PRE$ of the flexible panel 110 in the final time when the flexible panel 110 is bent or folded. Therefore, a delay for displaying the image on the display system 100 can be avoided. Moreover, even if the prediction angle $\theta\_PRE$ is different from a final display angle $\theta\_FIN$, a compensation image (e.g., the second display image DPI2 or the third display image DPI3) can be generated to the flexible panel 110 effectively through an interpolation method or an extrapolation method. Accordingly, on condition of allowable image distortion, time for displaying image by the display system 100 can be reduced, and fluency of watching image can be enhanced.

Although the present disclosure has been described in considerable detail with reference to certain embodiments thereof, other embodiments are possible, Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A display system, comprising:
   a flexible panel;
   a prediction unit configured to predict a prediction angle of the flexible panel in a final time when the flexible panel is bent or folded;
   a compensation unit configured to generate a first compensation image according to an initial display angle of the flexible panel in an initial time and configured to generate a second compensation image according to the prediction angle; wherein the second compensation image is generated before the final time;
   an image synthesis unit configured to synthesize a first display image according to the first compensation image and the second compensation image; and
   a control unit configured to selectively substitute the first display image for an image displayed on the flexible panel in the final time;
   wherein the control unit is configured to determine whether a final display angle of the flexible panel in the final time is substantially equivalent to the prediction angle, wherein when the final display angle is substantially equivalent to the prediction angle, the control unit substitutes the first display image for the image displayed on the flexible panel in the final time.

2. The display system of claim 1, wherein when the final display angle is larger than the prediction angle, the control unit generates a second display image according to the first compensation image, the second compensation image, the initial display angle, the prediction angle and the final display angle, and substitutes the second display image for the image displayed on the flexible panel in the final time.

3. The display system of claim 1, wherein when the final display angle is smaller than the prediction angle, the control unit generates a second display image according to the first compensation image, the second compensation image, the initial display angle, the prediction angle and the final display angle, and substitutes the second display image for the image displayed on the flexible panel in the final time.

4. The display system of claim 1, wherein the prediction unit predicts the prediction angle according to a velocity and an acceleration of the flexible panel when the flexible panel is bent or folded.

5. An image compensation method for a flexible panel, comprising:
   generating a first compensation image according to an initial display angle of the flexible panel in an initial time;
   predicting a prediction angle of the flexible panel in a final time when the flexible panel is bent or folded;
   generating a second compensation image according to the prediction angle; wherein the second compensation image is generated before the final time;
   synthesizing a first display image according, to the first compensation image and the second compensation image; and
   selectively substituting the first display image for an image displayed on the flexible panel in the final time;
   wherein the step of selectively substituting the first display image for the image displayed on the flexible panel in the final time comprises:
   determining whether a final display angle of the flexible panel in the final time, is substantially equivalent to the prediction angle; and
   substituting the first display image for the image displayed on the flexible in the final time when the final display angle is substantially equivalent to the prediction angle.

6. The image compensation method of claim 5, wherein the step of selectively substituting the first display image for the image displayed on the flexible panel in the final time further comprises:
   generating a second display image according to the first compensation image, the second compensation image, the initial display angle, the prediction angle and the final display angle when the final display angle is larger than the prediction angle; and
   substituting the second display image for the image displayed on the flexible panel in the final time.

7. The image compensation method of claim 5, wherein the step of selectively substituting the first display image for the image displayed on the flexible panel in the final time further comprises:
   generating a second display image according to the first compensation image, the second compensation image, the initial display angle, the prediction angle and the final display angle when the final display angle is smaller than the prediction angle; and
   substituting the second display image for the image displayed on the flexible panel in the final time.

8. The image compensation method of claim 5, wherein the step of predicting the prediction angle of the flexible panel in the final time when the flexible panel is bent or folded comprises:
  predicting the prediction angle according to a velocity and an acceleration of the flexible panel when the flexible is bent or folded.

9. A non-transitory computer readable storage medium for executing an image compensation method, the image compensation method comprising:
  generating a first compensation image according to an initial display angle of the flexible panel in an initial time;
  predicting a prediction angle of the flexible panel in a final time when the flexible panel is bent or folded;
  generating a second compensation image according to the prediction angle; wherein the second compensation image is generated before the final time;
  synthesizing a first display image according to the first compensation image and the second compensation image; and
  selectively substituting the first display image for an image displayed on the flexible panel in the final time;
  wherein the step of selectively substituting the first display image for the image displayed on the flexible panel in the final time comprises:
  determining whether a final display angle of the flexible panel in the final time is substantially equivalent to the prediction angle; and
  substituting the first display image for the image displayed on the flexible in the final time when the final display angle is substantially equivalent to the prediction angle.

10. The non-transitory computer readable storage medium of claim 9, wherein the step of selectively substituting the first display image for the image displayed on the flexible panel in the final time further comprises:
  generating a second display image according to the first compensation image, the second compensation image, the initial display angle, the prediction angle and the final display angle when the final display angle is larger than the prediction angle; and
  substituting the second display image for the image displayed on the flexible panel in the final time.

11. The on-transitory computer readable storage medium of claim 9, wherein the step of selectively substituting the first display image for the image displayed on the flexible panel in the final time further comprises:
  generating a second display image according to the first compensation image, the second compensation image, the initial display angle, the prediction angle and the final display angle when the final display angle is smaller than the prediction angle; and
  substituting the second display image for the image displayed on the flexible panel in the final time.

12. The non-transitory computer readable storage medium of claim 9, wherein the step of predicting the prediction angle of the flexible panel in the final time when the flexible panel is bent or folded comprises:
  predicting the prediction angle according to a velocity and an acceleration of the flexible panel when the flexible is bent or folded.

* * * * *